Aug. 29, 1961 R. L. HOLLINGSWORTH 2,997,847
COMBUSTION ENGINES FOR ROCKETS AND AEROPLANES
Filed Dec. 20, 1957 7 Sheets-Sheet 1
FIG. 1.
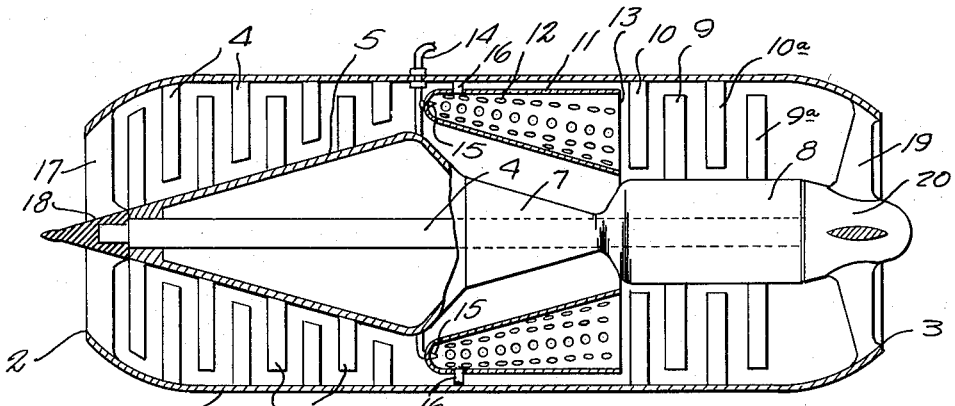
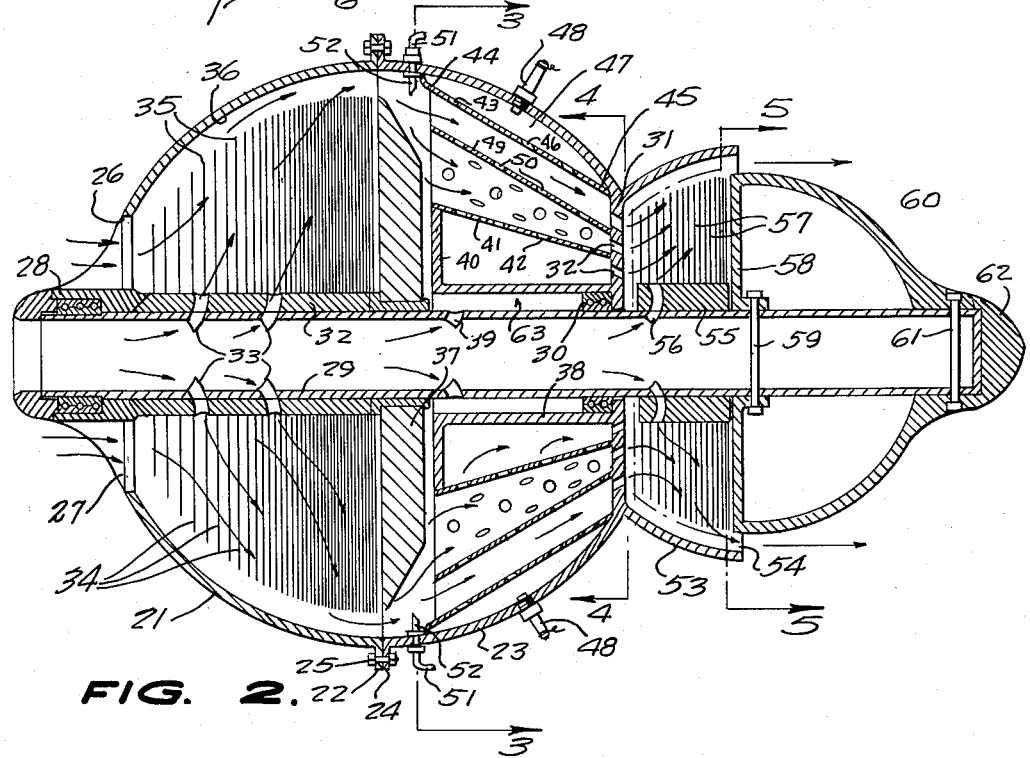
FIG. 2.
INVENTOR.
R. LEE HOLLINGSWORTH,
BY
ATTORNEYS.

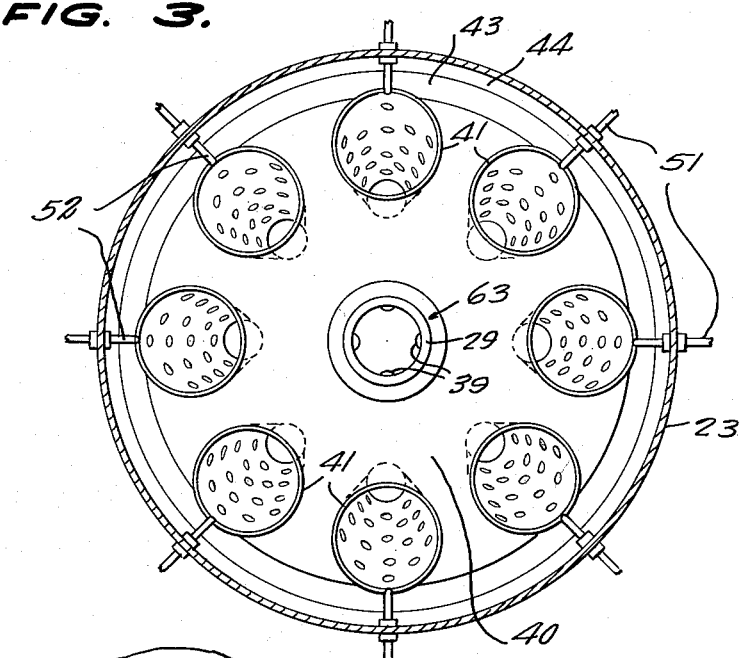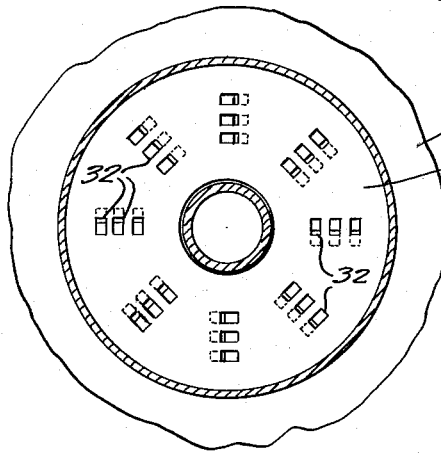

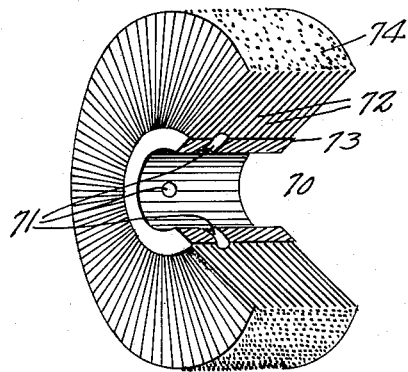
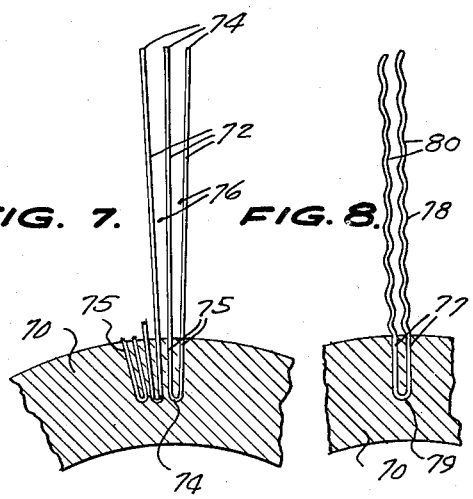
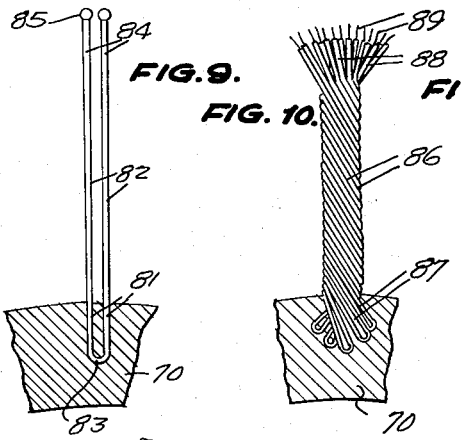
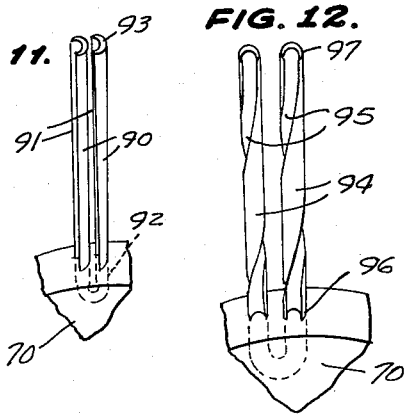
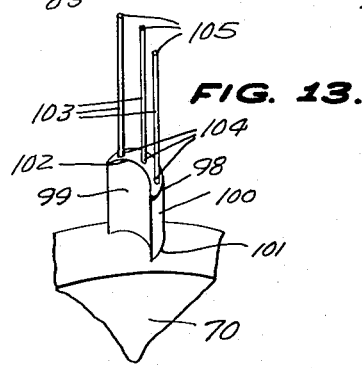
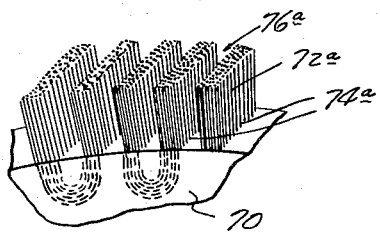

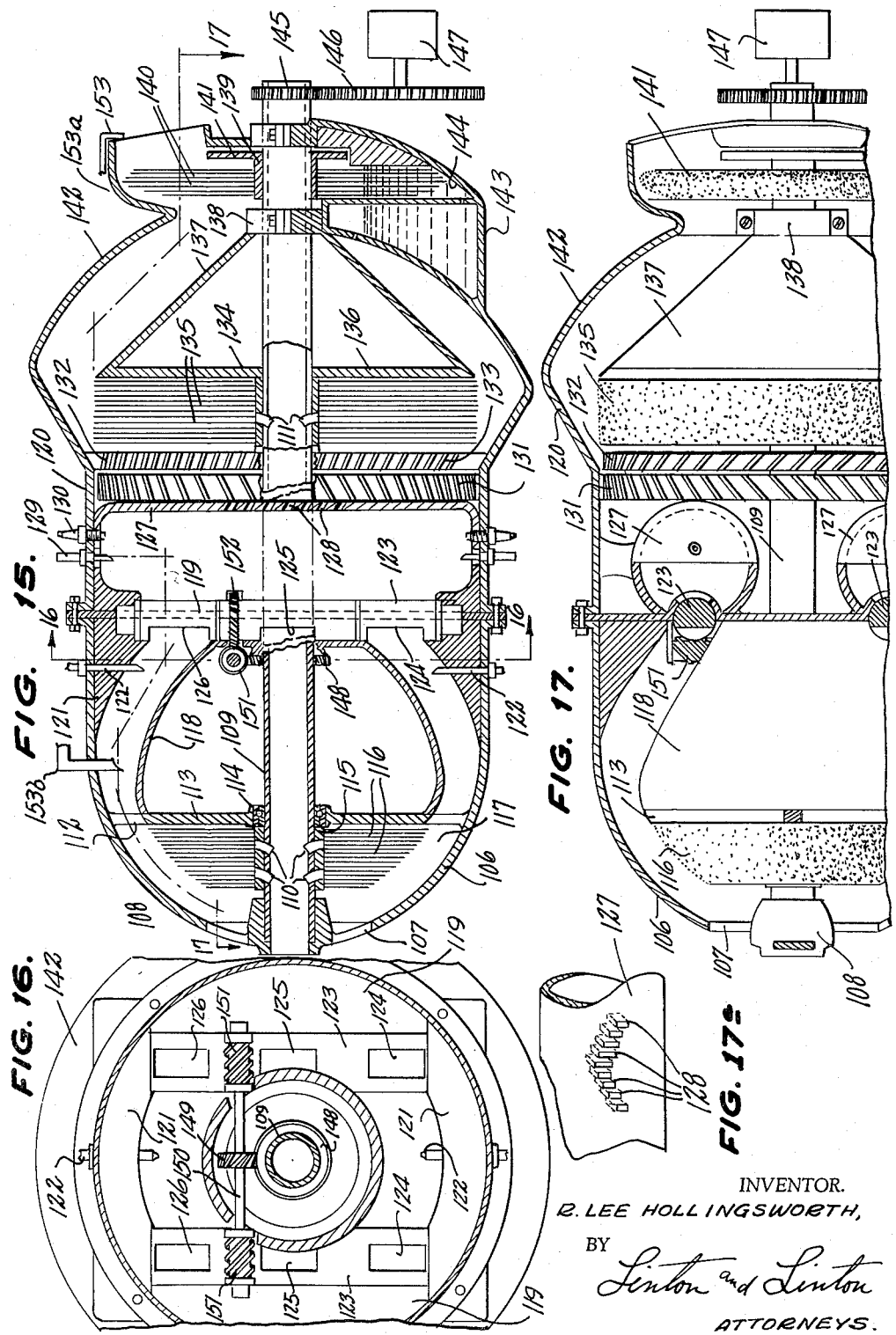

INVENTOR.
R. LEE. HOLLINGSWORTH,
BY
Linton and Linton
ATTORNEYS.

Aug. 29, 1961 R. L. HOLLINGSWORTH 2,997,847
COMBUSTION ENGINES FOR ROCKETS AND AEROPLANES
Filed Dec. 20, 1957 7 Sheets-Sheet 6
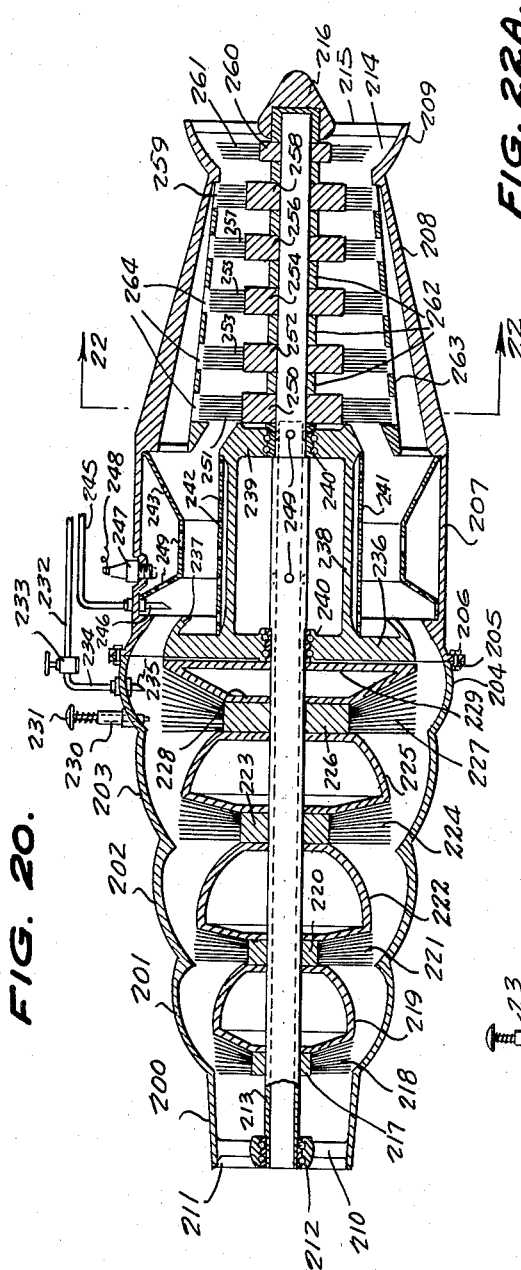
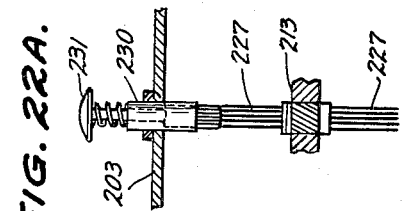
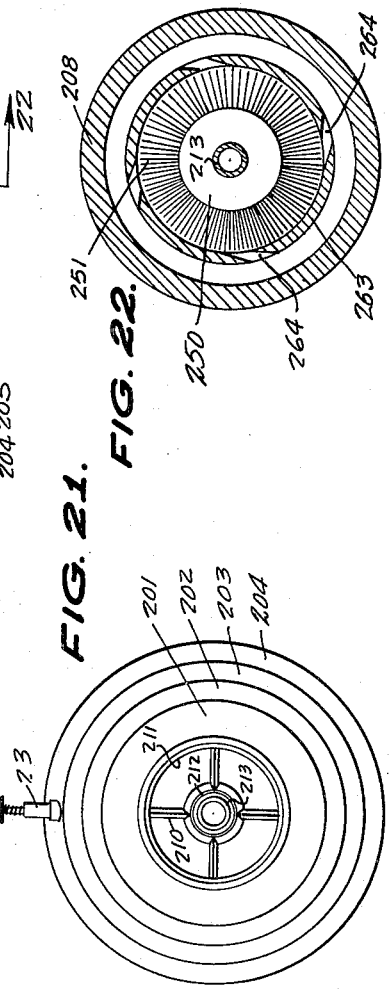
INVENTOR.
R. LEE HOLLINGSWORTH,
BY
Linton and Linton
ATTORNEYS Aug. 29, 1961   R. L. HOLLINGSWORTH   2,997,847
COMBUSTION ENGINES FOR ROCKETS AND AEROPLANES
Filed Dec. 20, 1957                    7 Sheets-Sheet 7
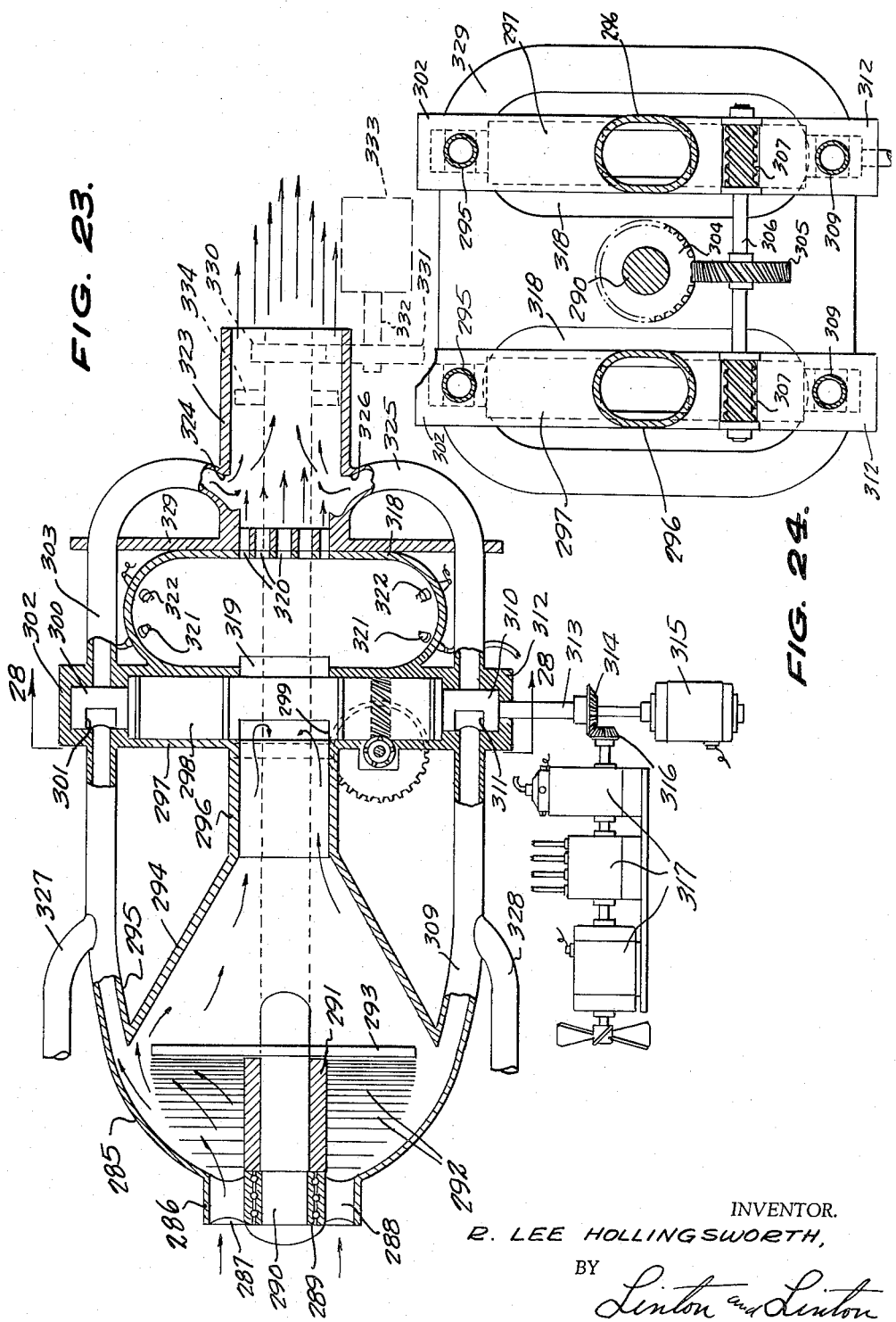
INVENTOR.
R. LEE HOLLINGSWORTH,
BY
Linton and Linton
ATTORNEYS.

United States Patent Office 2,997,847
Patented Aug. 29, 1961

2,997,847
COMBUSTION ENGINES FOR ROCKETS AND AEROPLANES
R. Lee Hollingsworth, 514 Hempstead Ave., West Hempstead, N.Y.
Filed Dec. 20, 1957, Ser. No. 704,111
25 Claims. (Cl. 60—39.38)

The present invention is concerned with combustion engines and is more particularly directed to turbine power plants of the gas or rocket reaction or turbo-prop type.

The principal object of the invention is to provide more efficient engines producing peaks of power through improved compressors, bunching of the air in volume immediately before the air enters the burner section of the engine to provide better combustion, and to give greater working power through the engine and out the exhaust.

A further important object of the invention is to provide a gas turbine that can be used in ground vehicles as well as in aircraft and for general use where motor power is required.

A still further and important object of the invention is to provide an improved combustion engine capable of utilizing various types and grades of fuels at the same time with high explosive impulse power and with full air cooling throughout the engine to reduce heat stresses on materials affording greater speeds, efficiency and thrust.

An additional object of the invention is to provide reaction engines combining ram-jet and turbine action in an engine for promoting the flow of air in smooth currents as a means of compression, agitation for better mixing and burning with fuels, to produce high rotational speeds of a common shaft and by centrifugal force, acceleration at the exhaust to provide greater thrust by faster movement of the exhaust and a degree of muffling of the sounds of the exhaust.

Another object of the invention is to provide a new method of fuel compression in engines for the generation of a great peak of power with means to utilize this power and for using rarified air in the form of opposing air currents to absorb full peak explosive power.

Also it is an object of the invention to simplify and improve on centrifugal type fans, blower and compressors.

Further objects of the invention will be in part obvious and in part pointed out in the following description of the accompanying drawings in which:

FIG. 1 is a longitudinal sectional view of a conventional gas turbine engine.

FIG. 2 is a longitudinal sectional view of one form of reaction engine according to the invention.

FIG. 3 is a cross-sectional view taken on line 3—3 of FIG. 2.

FIG. 4 is a cross-sectional view taken on line 4—4 of FIG. 2.

FIG. 5 is a cross-sectional view taken on line 5—5 of FIG. 2.

FIG. 6 is a perspective view with a portion removed to show details of a turbine rotor forming part of an engine according to the invention.

FIG. 7 is an enlarged sectional view of a portion of said rotor.

FIG. 8 is an enlarged sectional view of a portion of a modified form of rotor.

FIG. 9 is an enlarged sectional view of a portion of another form of rotor.

FIG. 10 is an enlarged sectional view of a portion of another form of rotor.

FIG. 11 is an enlarged perspective view of a portion of another form of rotor.

FIG. 12 is an enlarged perspective view of a portion of another form of rotor.

FIG. 13 is an enlarged perspective view of a portion of another form of rotor.

FIG. 14 is an enlarged perspective view of a portion of another form of rotor adaptable and usable on my invention.

FIG. 15 is a longitudinal sectional view of a second embodiment of my reaction engine.

FIG. 16 is a partial cross-sectional view taken on line 16—16 of FIG. 15.

FIG. 17 is a partial longitudinal sectional view of the engine of FIG. 15 but taken at right angles to said FIG. 15.

FIG. 17a is a side view of the exhaust portion of a combustion chamber forming part of said engine.

FIG. 20 is a longitudinal sectional view of a fourth form of reaction engine.

FIG. 21 is an elevation of the intake end of said engine taken from the left of FIG. 20.

FIG. 22 is a cross-sectional view taken on line 22—22 of FIG. 20.

FIG. 22a illustrates a detail of FIG. 22.

FIG. 23 is a longitudinal sectional view of another embodiment of the present invention.

FIG. 24 is a cross sectional view taken on line 28—28 of FIG. 23.

Figure 18:
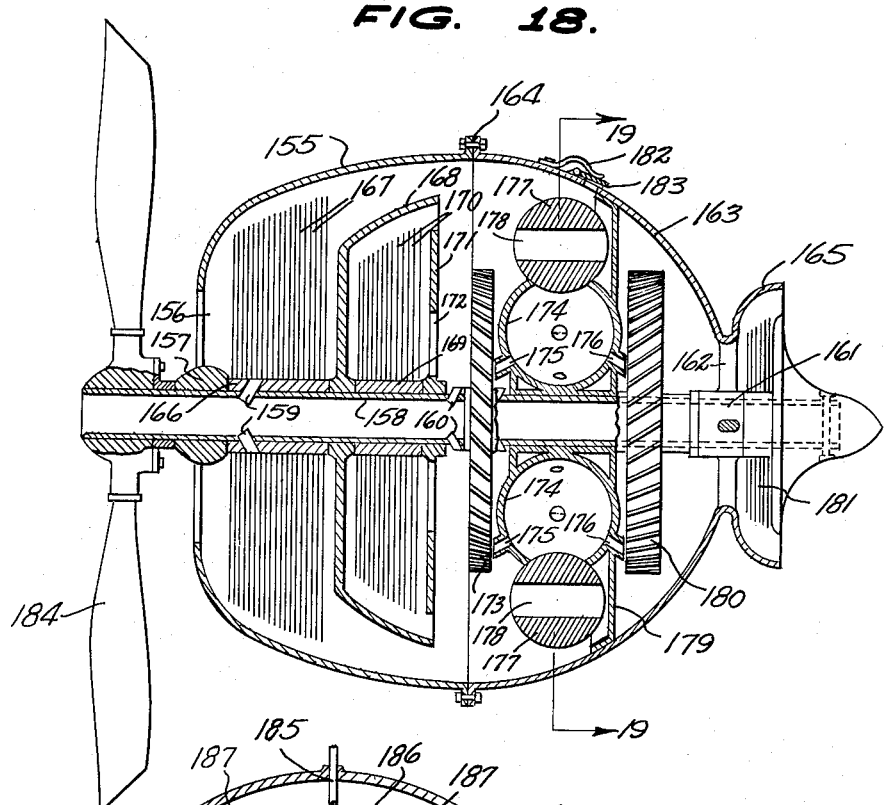
FIG. 18 is a longitudinal sectional view of another embodiment of my reaction engine.

Referring now more in detail to the accompanying drawings wherein like and corresponding parts are designated by similar reference characters, numeral 1 of FIG. 1 refers to the housing of a conventional jet or turbo-prop aircraft engine having open ends 2 and 3 and within which radially extends stator blades 4. A shaft 5 extends lengthwise of said housing and has radially extending compressor blades 6 extending between said stator blades 4 for providing a compressor of the air entering opening 2. Said shaft has a reduced medial portion 7 and an opposite end portion 8 supporting radially extending rotor blades adjacent a plurality of stator blades connected to said housing for providing a turbine drive for said shaft when the engine is used as a straight jet engine. However, when the engine is employed as a turbo-prop engine, an additional rotor blade 9a extends from said shaft adjacent additional stator blades 10a of said housing and said shaft is connected to a propeller (not shown). Conical burning chambers are positioned around portion 7 of said shaft and have perforations 12 in the sides thereof, while the open ends 13 are directed towards the stator blades 10. The fuel pipe 14 supplies fuel to within each of said chambers 11 through nozzles 15 while igniting means 16 are provided for each of said chambers, such as spark plugs connected to a source of current.

Support arms 17 extend across opening 2 of said housing and have a bearing 18 supporting one end of said shaft while arms 19 extend across opening 3 and have a bearing 20 for supporting the opposite end of said shaft.

In the operation of this engine air enters opening 2 and is compressed by the blades 4 and 6 and moved thereby through openings 12 into each chamber 11 for mixing the fuel and being continuously ignited. The exhaust openings 13 strike vanes 9 and 10 for rotating shaft 5 and then passes opening 3 for providing a reaction thrust to the engine. In the case of a turbo-prop engine, the exhaust also strikes vanes 9a and 10a giving additional impetus to the rotation of said shaft.

In the operation of such engines, air is greatly accelerated as it converges at the end of the compressor and then slows down as it suddenly passes into the greatly enlarged burner area around shaft portion 7. The temperature rise of the air is not appreciable until it reaches the burners 11 where it rises rapidly to about 1600° F. as it strikes the drive turbine blades. The pressure of the air does not rise above the compressor pressure indicating a fast exhaust of the air while the temperature after reaching its peak at the entrance to the drive turbine drops to about 1000° F. at the opening 3. Substantially 30% of the total drive turbine power is used to run the main shaft 5 including the compressor and auxiliaries while the remaining power develops the thrust at the point of exhaust at opening 3. In a turbo-prop engine about 60% of the drive turbine power is delivered to shaft 5 to run the propeller, compressor and auxiliaries while substantially 30% thrust in the form of a jet pushing power expels through opening 3. The foregoing suggests a need for increased pressure in the burner chambers during fuel burning therein and means to produce and utilize more power in a shorter time with at least some increased thrust as an aid to more efficient operation, quieter exhaust and to help reduce the heat within the engine. The present invention meets at least some of these needs among other things.

FIG. 2 discloses one embodiment of the present invention to be used either as a jet and/or turbo-prop engine. Numeral 21 refers to a spherical housing having an open end 26 with arms 27 extending therein and supporting a bearing 28. A cylindrical shaft 29 of considerable diameter has its open end rotatably supported through bearing 28 while a medial portion is rotatably supported by bearing 30 fixedly connected to a stator plate 31 extending across the opposite end of said housing.

A hub 32 concentric with said shaft is fixedly connected thereto while air scoops 33 extend through said shaft and said hub. A plurality of fingers 34 are fixedly connected to said hub in any desired manner therearound and extend radially therefrom. These fingers can be of various shapes and materials as more specifically described hereinafter and can be spaced apart varying distances while their free ends 35 are spaced from and follow the contour of the interior wall 36 of said housing. Said spacing can be varied depending upon the volume of air to flow therebetween and by varying the length of the individual fingers. A relatively thick baffle plate 37 is fixedly connected onto said shaft and extends alongside of the intermost finger 34 for preventing media from reaching said fingers from its side thereof and for forming the front wall of the combustion chamber. A tube 38 extends concentric with said shaft from stator 31 towards said baffle 37 but is spaced from said shaft and said baffle plate. An air scoop 39 extends through said shaft within said tube 38. A disc 40 fixedly connected to tube 38 extends substantially parallel to, but spaced from baffle 37 and a conical member 41 is fixed to both disc 40 and stator 31 and has openings 42 therethrough. A further conical member 43 is concentric with member 41 but has its ends connected to said housing at 44 and 45 and openings 46 therethrough providing an ignition area 47 into which extends an igniter 48. A third conical member 49 is positioned between members 41 and 43 being spaced therefrom providing combustion chambers therebetween and has openings 50 therethrough.

A fuel pipe 51 has a nozzle 52 extending through said housing above said baffle plate.

A curved annular flange 53 is connected to stator 31 exteriorly of said housing. A hub 55 is fixedly mounted on and is conical with said shaft while air scoops 56 extend through said shafts and said hub. A plurality of fingers 57 which also may be of various types, sizes and configurations as more fully explained hereinafter are fixedly connected to said hub in any desired manner therearound and extend radially therefrom towards but spaced from flange 53 providing a space 54 therebetween. A baffle plate 58 is fixedly connected to said shaft by bolts 59 and extend alongside of fingers 57 while a streamlined casing 60 extends therefrom and is connected by a bolt 61 to said shaft while terminating in hub 62.

In the operation of the present engine, shaft 29 is rotated by conventional starting means causing fingers 34 to draw air in through the open end of said housing and by centrifugal force to move said air longitudinally of the fingers striking inner wall 36 which guides the same around baffle plate 37. Fuel from nozzles 52 is mixed therewith and enters the ignition chamber through openings 46 being ignited by igniter 48 whereupon the flames therefrom pass through openings 46, 50 and 42 igniting the air and fuel mixture between members 43, 49, 41 and 38. The exhaust from said combustion chambers passes through openings 32 of stator 31 which are directed towards fingers 57 whereupon this exhaust will cause said fingers to move rotating shaft 29.

As shaft 29 increases its rotational speed, the starter is withdrawn and the engine will increase its speed depending upon the amount of fuel introduced therein and will also increase the speed of the vehicle to which the engine is connected causing an influx of air past arms 26 and also within the bore of shaft 29. The air within said shaft will gradually produce a ram jet effect with the air passing through scoops 33 for being thrown by fingers 34 against said housing. Some air will pass through scoops 39 to within space 63 and upwardly along disc 40 and baffle 37 for mixing with the air and fuel passing over said baffle. Further, air will pass through scoops 56 being thrown by fingers 57 into space 54 mixing with the exhaust and providing an after burner for producing the increased thrust. Said air from said shaft also decreases the temperature of the elements contacted thereby preventing an over-heating of the interior of the engine.

The area between conical member 23 and said housing provides a protected area which does not receive the full air blast containing the fuel, providing an ignition area where burning is more stable and thus keeps the main burning chambers from a possible flame out due to sudden gusts of gases in the atmosphere. The burning which takes place initially behind plate 43 passes to the other burning chambers for maintaining combustion therein. This is a new principle of primary ignition and burning of combustible mixtures applicable to all types of fluid engines. Thus, fuel of a more volatile quality can be first introduced to the ignition area and then a lower grade fuel to the entire burner chamber which contains more energy in B.t.u.'s.

Said fingers 34 and 57 can for example be of any of the types shown in FIGS. 6-14 inclusive wherein FIG. 6 is a cut-away perspective of one form of turbine rotor which includes a tubular hub 70 with air passages 71 provided laterally therethrough while a plurality of fingers 72 are positioned entirely around said hub and extend radially therefrom while fixedly being connected at one of their ends 73 to said hub while their free ends provide the annular periphery 74 of the rotor. As an example, finger 72 may be as shown in FIG. 7 an elongated rod like configuration with the end portions 73 of each pair of fingers connected by a U-shaped base 74 and embedded within hub 70 while said fingers 72 are spaced a slight distance apart providing numerous passageways 76 therebetween. Said fingers accordingly extend within radial openings 75 within said hub and the hub may be molded therewith or the fingers clamped, welded or soldered therein. Fingers 72 can be made of any material suitable to withstand the temperatures and pressures applied thereby but should have a slight resiliency allowing the same to flex and in the case of the drive turbine fingers should be capable of withstanding extreme temperatures. They may be of any cross-sectional configurations but may be formed of wire of a high tensile strength.

As indicated in FIG. 8, said fingers may have undulations 80 along their length as shown for fingers 73 with the end portions 77 of said fingers having each pair joined by a loop 79 embedded in hub 70.

Further, as shown in FIG. 9, fingers 82 can be employed which are substantially straight throughout and have end portions 81 for each pair thereof joined by loops 83 embedded in hub 70, while the free ends 84 of each finger has a bead 85 fixedly connected through which increase the centrifugal force along the length of the finger and helps to maintain the finger at right angles to said hub. When air, steam or hot gases impinge across the tips of these fingers when used as a turbine rotor, these enlarged beads increase their resistance to the on rushing air pressure and produces more work though the fingers retain their flexibility and individual tip resistance to pressure and heat.

FIG. 10 discloses a plurality of U-shaped wires 86 having their loose ends connected to hub 70 and being entwined one upon the other along their length except at their free ends 88 which diverge from one another. Wires 89 of reduced diameter are connected to each of said wires 86 and extend therefrom. Each hub 70 has a plurality of such entwined wire fingers connected thereto and thus provides a rotor of greater strength at high speeds.

FIG. 11 discloses one finger of a rotor 70 which is of a U-shaped configuration having its base 92 embedded in said hub while one side 90 of each leg is convex while the opposite side is concave with a convex side facing a concave side and the free ends 93 are substantially flat.

FIG. 12 discloses a U-shaped finger 96 having its base embedded in hub 70 while a longitudinally extending spiral groove 95 is provided in each of the legs 94 with said legs terminating in flat top ends 97.

The fingers of FIGS. 11 and 12 are of exceptional strength although slightly resilient and while firmly attached to their hub 70 can be rotated at very high speeds whereupon media will pass along their sides longitudinally under a high centrifugal force.

FIG. 13 shows a hub 70 with a turbine bucket 98 having a concave side 99, a convex side 100, affixed to hub 70. Said bucket has a flat free top 102 from which extends a plurality of wires 103 connected at their ends 104 thereto and having free ends 105.

Said fingers 103 serve to conduct and pull the intense heat away from the bucket 98 and thus the bucket can be used to utilize the hammer like blows from stator ports of turbine engines for rotational purposes, while fingers 103 absorb the media rapidly away from said bucket.

In FIG. 14 hub 70 has a plurality of series of U-shaped wires 72a having their base ends 74a fixedly connected thereto with the wires of each series being closely positioned together and the legs of adjacent series being spaced apart providing passages 76a therebetween.

Finger 90 serves to give increased thrust resistance when fast moving gases are embedded thereagainst at an angle substantially at right angles to its length. The finger 94 produces a uniform path of resistance to the passage of the impinging media when a large number of such fingers are assembled together upon hub 70.

The showing of these fingers of FIGS. 6–14 is by way of example only and they are not considered to be limited to the size or specific cross-sectional configuration as shown on the attached drawings.

A second form of the combustion engine is shown in FIGS. 15–17a inclusive which has a front casing 106 of a substantially U-shaped cross-sectional configuration with openings 107 in the base inlet end thereof together with a bearing 108. A tubular shaft 109 is rotatably supported at its inlet end within said bearing 108 while a plurality of scoops 110 are provided through said shaft adjacent said bearing, while further scoops 111 extend through the rear portion of said shaft.

A plurality of fingers 112 connect a baffle plate 113 which is attached to said casing 106 with said plate extending substantially perpendicular to said shaft and support a bearing 114 which also rotatably supports said shaft therethrough. A tubular hub 115 is concentric with said shaft and fixedly mounted thereon with scoops 110 also extending therethrough. A plurality of fingers 116 of various lengths are connected to said hub therearound and extend radially therefrom towards but spaced from the interior side of casing 106 providing a passageway 117 therebetween. An annular conical guide plate 118 is connected at one end to baffle 113 and to its opposite end to a partition 119 extending across the open end of casing 106. A second casing 120 is connected to said partition and casing 106 for extending contiguous therefrom.

An annular fillet 121 is connected to the interior side of said casing 106 having a configuration whereby it extends substantially parallel to the guide 118. A plurality of fuel supply nozzles 122 extend within the space between guide 118 and fillet 121 as well as through said fillet and casing 106. A plurality of elongated rotary valves 123 are rotatably supported at their ends within said fillet and each having a series of peripheral recesses 124, 125 and 126. A pair of elongated combustion chambers 127 are positioned within casing 120 with one of said rotary valves 123 positioned within and closing an inlet slot of each chamber while outlet ports 128 are formed through the opposite side of each chamber in the medial portion thereof. A plurality of fuel inlet nozzles 129 each extend through casing 120 into an end of one of said combustion chambers as do a plurality of ignition members 130 which may be spark plugs connected to a source of electrical current through a make and break distributor (not shown). This distributor is adjustable to vary the spark timing to position the explosions within the chamber as desired. A turbine rotor 131 is fixedly mounted on shaft 109 along side the exhaust side of said combustion chambers which have said ports 128 directed towards the vanes of said rotor with said ports extending on a curve as shown in FIG. 17a corresponding to the curve of said rotor. A stator plate 132 is fixedly connected to casing 120 on the other side of said rotor and has slanting ports 133 provided therethrough. A hub 134 is concentric with and fixedly connected to said shaft adjacent said stator plate and has scoops 111 extending therethrough. A plurality of fingers 135 are connected to and extend around said hub as well as radially. A baffle plate 136 extends along side of said fingers 135 on their side opposite to said stator plate and has a conical guide plate 137 connected to said baffle and also to a bearing 138 which rotatably supports the opposite end of shaft 109. A hub 139 concentric with and fixedly mounted on said shaft has a plurality of radially extending fingers 140 of varying length connected thereto and also a lateral flange 141. Casing 120 has a conical open end rear portion 142 from which extends a curved flange 143 forming a fluid reservoir in the lower portion thereof and supporting an arm 144 upon which bearing 138 is mounted. A gear 145 is fixedly mounted on shaft 109 and meshes with gear 146 for driving auxiliaries 147 which may include generators, pumps and the like for the operation of the engine and in some cases a gear box for driving a propeller.

In the operation of the present engine a starter which may be one of the auxiliaries designated by 147 rotates shaft 109 whereupon fingers 116 will draw media in through openings 107 and by centrifugal force direct the same into the passage 117 and along the guide 118 towards the rotary valves 123. Fuel will be admitted through nozzle 122 for mixing with said media. Shaft 109 has a gear 148 fixedly connected thereto for rotation of a pinion 149 which in turn drives shaft 150 to which is fixedly connected spiral gears 151 each meshing with a gear 152 fixedly connected on each rotary valve 123. Accordingly, said rotary valves are rotated thereby and the media and fuel mixture admitted to each recess 124, 125 and 126 will be admitted to said combustion chambers when these recesses enter said chambers upon rotation of said valves. Further fuel which may be the same or of a different grade and quantity than the fuel admitted by nozzle 122, can be admitted through nozzles 129 and the mixture in the combustion chambers ignited at the opposite ends thereof by the igniters 130 whereby the oppositely directed explosions will meet adjacent ports 128 and exhaust through rotor 131 and then through stator 132 against fingers 135. Said rotor 131 and fingers 135 will then continue to rotate said shaft and the starter can be discontinued. Fingers 135 will discharge the exhaust longitudinally thereof against casing portion 142 and against fingers 140 which are wetted by the liquid within flange 143 for cooling, scrubbing, scooping and quieting the sound of the exhaust. Shaft 109 will increase the revolutions depending upon the amount of fuel admitted and thus will cause the aircraft or vehicle to which the engine is connected to increase its speed whereby air will be admitted to the bore of shaft 109 with a ram jet effect and pass through scoops 110 and 111 for cooling the elements and being directed and propelled by the fingers 116 and 135 into the media passing therealong for increasing the compression and combustion within the engine giving added rotational thrust to the exhaust from the engine. It is preferred that an exhaust catching tube 153 be connected to end nozzle 122 or 129 in lieu of fuel for collecting a portion of the dampened exhaust and returning it to the main air stream. Alternatively, tube 152 may be extended from 153a to venturi nozzle connection 153b to provide a separate upstream point of reentry for the wetted gases from the exhaust The resulting explosion in chambers 127 gives a large surge of power to the rotor 131 and fingers 135 which causes the compressor unit provided by fingers 116 to impart a greater increased pressure to recesses 124, 125 and 126 of the rotary valves 123. This pressure will build up in front of said valves with the result that a regenerative effect will be obtained to the maximum rotational speed in accordance with the amount of fuel admitted. Thus, a greater increased air pressure with large air volume is admitted to the firing chambers and by this interruption of the air stream a peak air stream pressure is provided through the valves and peak explosive energy through the drive turbine. Also different grades of fuel may be injected at the opposite ends of the combustion chambers such as for example a high volatile fully refined fuel at one end, while a lower refined fuel can be injected at the opposite end causing the two fuels to provide a greater overall efficient fuel supply. However fuel can be admitted at only one end if desired.

Figure 19:
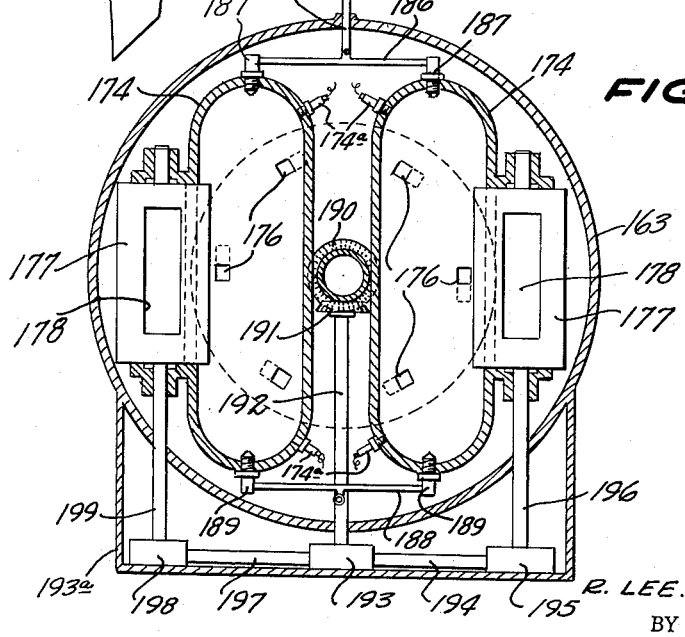
FIG. 19 is a cross-sectional view taken on line 19—19 of FIG. 18.

In FIGS. 18 and 19 there is disclosed a further form preferably of combustion engine in the form of a turboprop engine having an annular open end housing 155 with the inlet openings 166 at one end in which is supported a bearing 157 for a tubular shaft 158 rotatably extending therethrough. Scoops 159 extend through said shaft as do scoops 160. A second bearing 161 rotatably supports said shaft within the exhaust open end 162 of said housing which also supports said bearing. The rear portion 163 of said housing is detachably connected from the remainder by bolts 164 and has an outwardly curved flange 165 around said exhaust openings.

A hub 166 is concentric and fixedly connected to said shaft and also has scoops 159 extending therethrough while a plurality of fingers 167 are fixedly connected thereto therearound and extend radially therefrom. A cup-shaped baffle and guide plate 168 is mounted on said shaft adjacent the interior side of said fingers while a second hub 169 is fixedly connected to and concentric with said shaft and has fingers 170 extending radially therefrom and therearound towards but spaced from the interior sides of said plate 168. A disc-shaped baffle 171 is mounted on said shaft along the opposite sides of said fingers 170 to the base of plate 168 and has centrally positioned openings 172. A turbine rotor 173 is fixedly connected to said shaft adjacent a pair of closed combustion chambers 174 each of which has a series of exhaust openings 175 and 176 through opposite sides thereof with openings 175 being directed towards rotor 173. A pair of rotary valves 177 are each rotatably supported by one of said chambers and extend therein and also have ports 178 extending diametrically therethrough. A partition 179 extends across the rear portion 163 of said housing with exhaust openings 176 extending therethrough and directed towards a second turbine rotor 180 fixedly mounted on said shaft. A plurality of fingers 181 are fixedly connected to, around and concentric with said shaft and extend towards, but are spaced from flange 165.

A safety valve is provided by a resilient member 182 connected to a housing 155 and extending across opening 183 whereby excess pressures within said housing, sufficient to overcome the tension of said member, can force the same away from opening 183 and escape therethrough.

A fuel pipe extends through aid housing and around the inside thereof with branch pipe 186 connected thereto and having nozzles 187 extending through an end of said combustion chambers. Said pipe 185 also has a branch pipe 188 with nozzles 189 extending through the opposite end of said combustion chamber.

Shaft 158 has a gear 190 fixedly connected thereto which meshes with gear 191 fixedly connected to shaft 192 which shaft is connected to a gear box 193. Shaft 194 is connected within said gear box and also to a second gear box 195 for driving a shaft 196 which controls the rotation of valve 177. Gear box 193 is likewise connected by shaft 197 to gear box 198 which in turn drives shaft 199 and thereby the second rotary valve 177. A support 193a is connected to said housing also supports and encloses said gear boxes. Igniters 174a extend through the opposite ends of said combustion chambers for igniting fuel therein.

The combustion engine of FIGS. 18 and 19 is started by rotating shaft 158 until a sufficient speed is reached whereby fingers 167 draws media through openings 156 and passes the same longitudinally of said fingers against the interior of said housing. This compressed media is guided by said housing against the partition 179. Upon the rotary valves 177 being turned by said shaft 158 until their ports open the combustion chambers the compressed media backs up around said rotary valves and pours at high speed and under high compression through the ports 178 into the chambers 174. Upon the further rotation of said valves closing said chambers, fuel is admitted through nozzles 187 and 189 and the igniters 174a ignite the mixture. The exhaust from this combustion passes through the ports 175 and 176 against turbine rotors 173 and 180 respectively causing the same to rotate said shaft 158. The speed of these rotors increases depending upon the fuel admitted to the chambers. The exhaust from rotor 173 passes to opening 172 against the inner end portion of fingers 170 which in turn directs the same against the plate 168 where the exhaust is intermingled with incoming compressed media for re-entry into the firing chambers thereby increasing the efficiency of the combustion therein. The exhaust from rotor 180 passes to opening 162 and against fingers 181 for giving additional rotating power to shaft 158 for assisting in driving propeller 184.

The ports 178 are cut through the center of rotary valves 177 which provides for a firing speed which is twice that of the previously described rotors 123.

However, these rotary valves can be interchanged in the two engines if desired.

The firing of explosives in the chambers 174 towards each other produces higher compressions and provides more peak power through the exhaust.

In FIGS. 20–22 inclusive a still further form of combustion engine is disclosed having an annular casing 200 stepped longitudinally with curved steps 201, 202, 203 and 204. Flange 205 of said casing is connected by bolts 206 to a tubular casing 207 having inwardly tapering end portion 208 and outwardly flaring mouth flange 209. Casing 200 has arms 210 connected thereto within its inlet end 211 supporting bearing 212 which in turn rotatably supports a tubular shaft 213 while flange 209 which provides the exhaust outlet 214 of the engine supports arms 215 and bearing 216 which closes and rotatably supports the opposite end of said shaft. A hub 217 is fixedly mounted on said shaft and has fingers 218 extending radially therearound and also is connected to an annular guide member 219 both of which are positioned within step 201. Similarly hub 220 is connected to said shaft and to fingers 221 extending radially therearound and to an annular guide member 22 both of which are positioned within step 202. Hub 223 is fixedly connected on said shaft and has fingers 224 extending radially therearound and is also connected to an annular guide member 225 both of which are within step 203. Hub 226 also fixedly connected to said shaft has fingers 227 extending radially therearound and is connected to an annular baffle 228 extending along the inner side of fingers 227 and having a flat base 229.

A flint igniter tube 230 is mounted through step 204 and has a spring loaded plunger 231 with a flint on the inner end thereof for engaging fingers 227 upon said plunger being moved inwardly for providing sparks as a manual igniter for the engine.

It is to be appreciated that the flint igniter mechanism may also be used to pulverize a stick of solid material fuel such as metal, coal, a strand of plastic like material which becomes highly volatile when pulverized and fed into a hot gas flame, thus providing for the use of a wide variety of fuels for non-piston types of combustion engines. This mechanism is shown enlarged in FIGURE 22a. For this fuel supply use, pressure loaded plunger 231 may comprise known means capable of advancing a length of solid fuel towards the rotor.

Fuel line 232 connected to a valve 233 which in turn is connected to a pipe 234 having a nozzle 235 extending through step 204.

Plate 236 is preferably rotatably mounted on said shaft and has an inwardly extending guide flange 237 and a cylindrical extension 238 whose base 239 is also preferably rotatably mounted on said shaft with bearings 240 positioned around said shaft for these purposes. A tubular member 241 surrounds projection 238 and has openings 242 therethrough. An annular member 243 of a cup-shaped configuration has its top ends connected to casing 207 and provides a pre-ignition chamber therewith. Said chamber 243 is concentric with member 242 and has openings 44 therethrough. A fuel line 245 has a nozzle 246 adjacent said member 243 while an igniter 247 extends through casing 207 in said pre-ignition chamber and is connected by wire 248 to a source of electrical current.

Scoops 249 extend through said shaft. A series of hubs 250, 252, 254, 256, 258 and 260 are fixedly mounted on said shaft and have fingers 251, 253, 255, 257, 259 and 261 respectively connected thereto and extend radially therefrom while a plurality of spacers are positioned between each of said hubs 262. A tubular member 263 is connected to but spaced from the interior of casing end portion 208 surrounding fingers 251, 253, 255, 257 and 259 and angular openings 264 therearound in line with each of said fingers.

The present form of combustion engine is started by rotating shaft 213 whereupon fingers 218 will draw media through opening 210 and through the same against the interior side of step 201 which in turn will direct the same against fingers 221 and these fingers will direct the same against step 202 which guides the media to fingers 224 and they in turn against step 203 which turns the media to fingers 227 whereby it is directed against step 204 around flange 237 to within the combustion area between member 242 and casing 207. Each of said fingers 218, 221, 224 and 227 are of increasing lengths and the guide members 219, 222 and 225 extend towards the connected end of the fingers 221, 224 and 227 respectively and provide increasingly large passageways with the steps 201, 202, and 203 respectively forming a multiplicity of accelerating areas along the down-stream length of the compressor producing high velocity through the compressor and an engine having a minimum possible diameter. Fuel can be admitted through nozzle 235 and if necessary plunger 231 compressed providing sparks to ignite the mixture therearound. The compressed exhaust passes through openings 244 for being further ignited by the igniter 247 and additional fuel can be entered through nozzle 246. The flame from openings 244 will ignite the mixture around member 242 and the exhaust will pass against the sides of said fingers within casing portion 208 on both sides of tube 263. That portion of the exhaust passing through openings 264 will impinge upon the tips of said fingers to give considerable thrust and to store momentum therein to produce rotational power to shaft 213. The exhaust within casing portion 208 strikes fingers 261 for being muffled thereby and also accelerated to increase the speed of said exhaust. The fingers within casing portion 208 direct the exhaust against the openings 264 while some exhaust is entering the same causing a fluid reaction therebetween for increasing the travel of said gases and the pressure on the tips of said fingers. The fingers shown in FIG. 10 of the drawings are particularly adaptable for using as the fingers within said casing portion 208.

A still further form of combustion engine is disclosed in FIGS. 23 and 24 which has a curved front housing 285 from which extends an annular flange 286 providing an inlet opening 287 and in which extend arms 288 supporting a bearing 289. Said bearing supports the forward end of a shaft 290. A hub 291 is concentric with and fixedly connected to said shaft and has a plurality of fingers 292 connected thereto at one end and extending therearound and radially therefrom. Said fingers are preferably spaced gradually closer together towards the inner end of said hub and are of gradually increasing lengths whereby the outer free ends assume the contour corresponding to casing 285, but spaced therefrom. Baffle plate 293 is also fixedly connected to said shaft and extends along the innermost of said fingers for preventing the passage of media to the inner side of said fingers.

A plurality of conical tubes 294 are connected to casing 285 as are a plurality of tubes 295. Each tube 294 is connected to one of a plurality of conduits 296 which in turn is connected to one of a pair of valve housings 297 rotatably supporting therein an elongated rotary valve 298 which has a peripheral recess 299 in the medial portion thereof in communication with conduit 296. Each rotary valve further has a cylindrical extension 300 at the upper end thereof which also has a peripheral recess 301 in communication with tube 295 and closely encased within recess 302 of said valve housing. A tube 303 extends from recess 302 on a side opposite to tube 295.

Shaft 290 has a gear 304 fixedly connected thereto and meshing with pinion 305 fixedly connected to shaft 306 for rotating gears 307 each of which meshes with a gear 308 fixed to one of said rotary valves for rotating said valves.

A plurality of tubes 309 extend from casing 285 to the lower end 312 of each of said valve housings which contain a cylindrical extension 310 of each rotary valve and each extension has a peripheral recess 311 in communication with tube 309. This valve extension further is connected to a shaft 313 having gear 314 and an auxiliary such as a starter 315 connected thereto. Gear 314 further meshes with gear 316 which drives a plurality of auxiliaries shown by way of example only as coils for the igniters, pumps for the fuel lines and electrical generator for supplying current to the igniters.

A pair of closed combustion chambers are each connected to one of said valve housings and each have an inlet port 319 for communicating with recess 299 of its adjacent valve. Each chamber further has outlet ports 320 while fuel inlet nozzles 321 are positioned through adjacent ends thereof as are igniters 322. An exhaust conduit 323 is in communication with the ports 320 of both chambers and also has the outlet end 324 of each tube 303 opening therein and also a plurality of tubes 325 each connected to end 312 of a valve housing which has outlet end 326 opening therein. Shaft 290 also extends within conduit 323.

An open end plurality of tubes 327 are connected to each of the tubes 295 and similarly a plurality of open end tubes 328 are each connected to one of the tubes 329. A support 329 interconnects tube 303, 325 with the combustion chambers and the exhaust conduit 323.

Shaft 290 has a gear 330 fixedly connected thereto and meshing with the gear 331 for driving shaft 332 for operating auxiliaries or propellers as indicated at 333. Further, said shaft has a drive turbine 334 fixedly connected thereto within said exhaust conduit for driving said shaft as the exhaust passes thereby.

In the operation of the combustion engine of FIGS. 27 and 28, starting starter 315 for example will rotate the connected rotary valve and thereby the shaft 290 whereupon fingers 292 will draw air in through opening 287 and discharge the same against housing 285 where it passes into each of the conduits 294, 296 and also into each of the tubes 295 and 309. Upon rotation of the valve 298, the air in each recess 299 will be admitted to each firing chamber mixed with fuel from nozzle 321 ignited by igniters 322 and the resulting combustion exhausted through ports 320 and conduit 323. Turbine 334 will continue to rotate shaft 290 after stopping said starter, gradually increasing the rotation of said shaft which will be determined by the amount of fuel supplied. As the speed of the reaction increases, the speed of the vehicle to which the engine is attached will increase forcing more air into tubes 327 and 328 with a ram jet effect which air will be intermittently transferred to tubes 323 and 325 by recesses 301 and 311 where this air will mix with the exhaust in conduit 323 increasing the combustion and resultant fluid force passing therefrom through drive turbine 334.

Preferably recesses 301 and 311 are arranged for transmitting air to tubes 303 and 305 ahead of the transfer of air by the recess 299 to the combustion chambers in order to let the peaked air stream travel to the exhaust conduit 323 by the time combustion takes place in each combustion chamber so that the exhaust therefrom will react violently with the compressor ram jet air in the exhaust conduit whereby a maximum thrust is obtained from the engine. By gating the air in tubes 295, 296 and 309, the air is compressed to obtain peak loading of the combustion chamber and the exhaust conduit and also causes the engine to run extremely cool.

The various fingers referred to in the different modifications of the combustion engines may be of the form shown in either of FIGS. 7–14 inclusive and also may take other forms and shapes from those shown therein since one of the chief features of the present invention is to increase the pressure due to burning, in the burner of a fluid type turbo motor, by supplying a greater amount of air from the frontal area or compressor area, in the shortest period of time.

It is to be further appreciated that any hollow turbine shaft may contain a large number of angled holes therein to admit air to critical heat areas along the hollow portion or length of the hollow shaft.

While a rotating port type valve is illustrated, in order to admit more air in less time, it is intended that cam operated valves may also be used when and where desired to provide the pulsed type jet action desirable herein. It is to be appreciated that with the valves left or stopped in the open position, the engine then runs as a reaction turbine.

The present devices are capable of considerable modification and such changes thereto as come within the scope of the appended claims are deemed to be parts of the present invention.

What is claimed is:

1. A combustion engine comprising an open ended hollow housing, a hollow shaft extending lengthwise of said housing and being rotatably supported therein, a plurality of metallic flexible fingers connected to and extending radially from a portion of said shaft for receiving a free flowing media through the open end of said housing and centrifugally moving said media towards and along the interior of said housing, said housing being shaped internally for directing said media lengthwise thereof, means for introducing fuel within said housing, at least one combustion chamber for receiving said media and fuel, means for igniting said media and fuel within said combustion chamber, and a turbine rotor connected to said shaft for receiving said ignited media and fuel for being rotated thereby, said hollow shaft having the front end open to take in air and having propelling means therein and further having outlets from said propelling means within said hollow shaft to deliver air of lower temperature to portions of said combustion engine for cooling desired areas of said combustion engine.

2. A combination engine comprising an open ended hollow housing, a hollow shaft extending lengthwise of said housing and being rotatably supported therein, a plurality of flexible fingers connected to and extending radially from a portion of said shaft adjacent one open end of said housing for centrifugally moving media against and along the interior of said housing, said housing being shaped internally for directing said media lengthwise thereof, means for introducing fuel within said housing, a plurality of open end combustion chambers extending lengthwise of said housing and positioned for receiving said media and fuel, means for igniting said media and fuel in said chambers, and a turbine rotor connected to said shaft and positioned for receiving said ignited media and fuel exhaust for being rotated thereby, said hollow shaft having the front end open to take in air and having propelling means therein and further having outlets from said propelling means within said hollow shaft to deliver air of lower temperature to portions of said combustion engine for cooling desired areas of said combustion engine.

3. A combustion engine comprising an open ended hollow housing, a hollow shaft extending lengthwise of said housing and being rotatably supported therein, a plurality of flexible fingers connected to and extending radially from a portion of said shaft for receiving media from one open end of said housing and moving same centrifugally lengthwise of said fingers, means within said housing for directing said moving media at an angle to said fingers, at least one closable combustion chamber in said housing, a valve for said combustion chamber controlled by said shaft and positioned for intermittently passing said moving media into at least one portion of said combustion chamber, means for introducing fuel to said media, means for igniting said media and fuel within said combustion chamber, said combustion chamber having an exhaust port and at least one turbine rotor connected to said shaft and positioned adjacent said combustion chamber exhaust port for receiving exhaust therefrom and being rotated thereby, said hollow shaft having the front end open to take in air and having propelling means therein and further having outlets from said propelling means within said hollow shaft to deliver air of lower temperature to portions of said combustion engine for cooling desired areas of said combustion engine.

4. A combustion engine as claimed in claim 1 wherein said shaft is cylindrical and extends with its open end adjacent one open end of said housing, and said shaft has side openings leading to the interior of said housing for directing media thereto.

5. A combustion engine comprising an open ended hollow housing, a hollow shaft extending lengthwise of said housing and being rotatably supported therein, a plurality of fingers connected to and extending radially from a portion of said shaft adjacent one open end of said housing, a baffle plate extending along one side of said fingers, a turbine rotor fixedly connected to said shaft, a plurality of open end annular perforated combustion chambers extending between said fingers and said rotor, means for introducing fuel to said chambers, means for directing media from said fingers to said chambers, and means for igniting said fuel and media in said chambers for being directed by said chambers to said rotor for rotating the same, said hollow shaft having the front end open to take in air and having propelling means therein and further having outlets from said propelling means within said hollow shaft to deliver air of lower temperature to portions of said combustion engine for cooling desired areas of said combustion engine.

6. A combustion engine as claimed in claim 5 wherein a perforated plate extends between said igniting means and said combustion chambers providing a primary lowered velocity ignition chamber directing the exhaust therefrom being directed into said combustion chambers for igniting fuel and media therein.

7. A combustion engine as claimed in claim 5 wherein a stator plate extends between said combustion chambers and said rotor and said plate has an angular opening for directing exhaust from said combustion chamber to said rotor.

8. A combustion engine as claimed in claim 5 wherein said turbine rotor consists of a plurality of rod-like fingers connected to said shaft and extending radially therefrom.

9. A combustion engine comprising an open end hollow housing, a hollow shaft extending lengthwise of said housing and being rotatably supported therein, a plurality of rod-like fingers connected to a portion of said shaft and extending radially therefrom, at least one closed combustion chamber mounted in said housing and having an inlet port, a rotary valve controlled by said shaft and mounted in said chamber inlet port for intermittently directing the flow of media therein, means for directing the flow of media from the free end of said fingers to said valve and forming a precompression chamber for said media, means for introducing fuel into said housing for mixing with said media, means for igniting said media and fuel in said combustion chamber, said chamber having fixed exhaust ports, a turbine rotor fixed to said shaft positioned for receiving exhaust from said chamber exhaust ports for being rotated thereby, said hollow shaft having the front end open to take in air and having propelling means therein and further having outlets from said propelling means within said hollow shaft to deliver air of lower temperature to portions of said combustion engine for cooling desired areas of said combustion engine.

10. A combustion engine as claimed in claim 9 wherein a second turbine rotor is fixed to said shaft, a stator is fixedly mounted in said housing and said second rotor and stator are positioned between said combustion chamber and first mentioned rotor.

11. A combustion engine as claimed in claim 9 wherein said valve has a plurality of admission ports positioned along said combustion chamber and said ignition means are positioned at opposite ends of said combustion chamber for igniting said media and fuel at opposite ends thereof at the same time.

12. A combustion engine as claimed in claim 9 wherein said housing has a liquid chamber adjacent the opposite open end thereof and a plurality of rod-like fingers are connected to said shaft and positioned for extending into said liquid and into the engine exhaust during rotation of said shaft, for cooling, cleaning and silencing said engine exhaust.

13. A combustion engine comprising an open ended hollow housing, a hollow shaft extending lengthwise of said housing and being rotatably supported therein, a plurality of rod-like fingers connected to a portion of said shaft and extending radially thereof, means in said housing for directing media received from said fingers lengthwise of said housing, a second plurality of rod-like fingers connected to a second portion of said shaft and extending radially thereof, a plate positioned between said two pluralities of fingers and of a configuration for directing media received from said second mentioned plurality of fingers lengthwise of said housing, at least one closed combustion chamber mounted in said housing, means for introducing fuel into said chamber, igniting means mounted in said chamber, an admission valve for said chamber controlled by said shaft for intermittently admitting said media to said chamber, a pair of turbine rotors fixedly mounted on said shaft with one rotor between said chamber and said second mentioned plurality of fingers and the other rotor mounted on an opposite side of said chamber to said first mentioned rotor, said chamber having outlet ports for directing exhaust from said chamber to said rotors for rotating said shaft, said hollow shaft having the front end open to take in air and having propelling means therein and further having outlets from said propelling means within said hollow shaft to deliver air of lower temperature to portions of said combustion engine for cooling desired areas of said combustion engine.

14. A combustion engine as claimed in claim 13 wherein a plate having a central opening is positioned alongside said second plurality of fingers for directing exhaust through said opening from said first mentioned rotor towards the shaft connected portion of said fingers.

15. A combustion engine as claimed in claim 13 wherein said housing has a divergent flange exteriorly of the other open end thereof, a third plurality of rod-like fingers are connected to said shaft within said flange and extend radially thereof and a plate is mounted on the side of said fingers opposite to said housing other open end.

16. A combustion engine comprising an open ended hollow housing, a hollow shaft extending lengthwise of said housing and being rotatably supported therein, said housing having an interior wall of a stepped configuration providing a series of acceleration areas, a series of pluralities of rod-like fingers connected to said shaft and extending radially thereof with each plurality of fingers being positioned within one of said housing interior steps, a plurality of guide members each positioned within one of said acceleration areas between one pair of said plurality of fingers with a side extending along one plurality of fingers and a second side extending towards the connected end of the second plurality of fingers of the pair of plurality of fingers on each side thereof, a second series of plurality of fingers connected to said shaft and extending radially thereof, a spacer member positioned between said two series of fingers, an annular perforated plate mounted within and against said housing concentric with said spacer member and providing a combustion chamber, means for introducing fuel within said housing, ignition means mounted within said combustion chamber and an annular guide member surrounding said second series of fingers spaced from said housing providing a passage therebetween and having side openings directed towards each plurality of fingers in said second series for guiding exhaust from said combustion chamber to the free ends of said fingers.

17. A combustion engine as claimed in claim 16 wherein said spacer member is hollow and said shaft has side openings leading into at least said spacer member for introducing a cooling media therein.

18. A combustion engine comprising an open ended hollow housing, a hollow shaft extending lengthwise of said housing and being rotatably supported therein, a plurality of rod-like fingers connected to a portion of said shaft adjacent an open end of said housing and extending radially from said shaft, means for guiding media from said fingers lengthwise of said housing, at least one closed combustion chamber with an inlet port, at least one rotary valve controlled by said shaft and extending across said combustion chamber port for intermittently opening and closing the same, a passageway leading from said fingers to said valve for directing said media thereto, means for introducing fuel into said combustion chamber, ignition means in said chamber, said chamber further having outlet ports, and exhaust tube connected to said combustion chamber in communication with said chamber outlet ports, tubes leading from said housing to said exhaust tube for directing a portion of said media thereto and said valve extending into said tubes for opening and closing the same.

19. A combustion engine comprising an open end hollow housing, a shaft extending lengthwise of said housing and being rotatably supported therein, a plurality of rod-like fingers connected to a portion of said shaft and extending radially therefrom, at least one closed combustion chamber mounted in said housing and having an inlet port, a valve controlled by said shaft and mounted in said chamber inlet port for intermittently directing the flow of media therein, means for directing the flow of media from the free end of said fingers to said valve and forming a precompression chamber for said media, means for introducing fuel into said housing for mixing with said media, means for igniting said media and fuel in said combustion chamber, said chamber having fixed exhaust ports, a turbine rotor fixed to said shaft positioned for receiving exhaust from said chamber exhaust ports for being rotated thereby.

20. In a combustion engine as claimed in claim 9 wherein said valve has a plurality of admission ports positioned along said combustion chamber and said ignition means are positioned within said combustion chamber for igniting said media and fuel within said combustion chamber at substantially the same time.

21. A combustion engine comprising an open ended housing and having at least a fluid compressor area, a fluid combustion area, and an exhaust area, a hollow shaft extending substantially through said engine, fluid impelling means attached exteriorly of said hollow shaft, and impelling means within said hollow shaft to deliver air from within said hollow shaft to at least the said combustion area and the said exhaust area, via openings in said hollow shaft.

22. The invention in accordance with claim 21, wherein a portion of said fluid impelling means is located within said exhaust area and is wetted as it rotates through said exhaust area and wetting means, to collect unburned fuel particles from the exhaust area and to cool the exhaust, and preferably including means for returning a portion of the exhaust content to the up stream portion of the said motor.

23. The invention in accordance with claim 21, wherein said exteriorly mounted impelling means mounted on said hollow shaft, is shaped to substantially conform to an expanding exhaust housing of said engine to diffuse with rotation the exhaust of said engine into a greater area of atmosphere and to translate the noise of the said exhaust.

24. The invention in accordance with claim 21, wherein a fluid impelling means is positioned in the exhaust stream of said engine to diffuse and translate the exhaust noise of said engine, said impelling means comprising a rotary wire brush-like mechanism mounted on a hollow open end shaft and cooled by air impelled via openings in the wall of said shaft and an opening through the hub of said mechanism.

25. A combustion engine comprising an open ended housing, and having at least a fluid compression area, a fluid combustion area, an ignition means, and an exhaust area, a shaft extending lengthwise within said motor, a means for supplying fuel to said motor wherein at least a part of said fuel is solid fuel, said means for supplying said solid fuel comprising an inlet through the wall of said engine to receive a stick of solid fuel with means to urge said stick of solid fuel against a rotating means on said shaft to diffuse the said solid fuel into dust-like particles within said engine.

References Cited in the file of this patent

UNITED STATES PATENTS

| | | |
|---|---|---|
| 1,035,364 | Leblanc | Aug. 13, 1912 |
| 1,103,606 | McLean | Jan. 2, 1912 |
| 1,324,607 | MacLean | Dec. 9, 1919 |
| 1,934,667 | Harter | Nov. 7, 1933 |
| 1,952,197 | Davis | Mar. 27, 1934 |
| 2,343,711 | Rusteberg | Mar. 7, 1944 |
| 2,479,143 | Traylor | Aug. 16, 1949 |
| 2,483,654 | Magdeburger | Oct. 4, 1949 |
| 2,514,749 | Dobbins | July 11, 1950 |
| 2,523,379 | Kollsman | Sept. 26, 1950 |
| 2,631,004 | Swansen | Mar. 10, 1953 |
| 2,631,429 | Jacklin | Mar. 17, 1953 |
| 2,635,426 | Meschino | Apr. 21, 1953 |
| 2,648,949 | Taylor | Aug. 18, 1953 |
| 2,696,712 | Lewis | Dec. 14, 1954 |
| 2,699,644 | Coanda | Jan. 18, 1955 |
| 2,720,753 | Sharpe | Oct. 18, 1955 |
| 2,722,101 | Wosika | Nov. 1, 1955 |
| 2,739,757 | Schlumbohm | Mar. 27, 1956 |
| 2,780,060 | Griffith | Feb. 5, 1957 |
| 2,800,767 | Taylor | July 30, 1957 |
| 2,803,946 | Holzwarth | Aug. 27, 1957 |
| 2,822,145 | McLean | Feb. 4, 1958 |
| 2,831,320 | Duncan | Apr. 22, 1958 |
| 2,832,192 | Budish | Apr. 27, 1958 |
| 2,888,803 | Pon | July 2, 1959 |

FOREIGN PATENTS

| | | |
|---|---|---|
| 491,080 | Canada | Mar. 10, 1953 |
| 1,119,844 | France | Apr. 9, 1956 |
| 332,859 | Great Britain | July 31, 1930 |
| 525,420 | Great Britain | Aug. 28, 1940 |
| 583,542 | Great Britain | Dec. 20, 1946 |